United States Patent
Nagamatsu

[11] Patent Number: 5,461,852
[45] Date of Patent: Oct. 31, 1995

[54] CHAIN AND CONNECTING PIN THEREOF

[75] Inventor: Hiromitsu Nagamatsu, Saitama, Japan

[73] Assignee: Hitachi Metals, Ltd., Tokyo, Japan

[21] Appl. No.: 238,025

[22] Filed: May 3, 1994

[51] Int. Cl.⁶ ................................................. F16G 13/06
[52] U.S. Cl. .................. 59/84; 59/78; 59/900; 59/5; 474/207
[58] Field of Search ................ 59/78, 84, 900, 59/5; 474/207, 234

[56] References Cited

U.S. PATENT DOCUMENTS

| | | |
|---|---|---|
| 4,123,947 | 11/1978 | Smith et al. ............................ 59/9 |
| 4,250,764 | 2/1981 | Grant ..................................... 59/84 |
| 4,271,663 | 6/1981 | Templin et al. ....................... 59/84 |
| 4,272,952 | 6/1981 | Graham ................................. 59/84 |
| 5,092,118 | 3/1992 | Van De Mark ....................... 59/84 |

FOREIGN PATENT DOCUMENTS

| | | |
|---|---|---|
| 61-12440 | 4/1986 | Japan . |
| 514700 | 2/1993 | Japan . |
| 599278 | 4/1993 | Japan . |

*Primary Examiner*—David Jones
*Attorney, Agent, or Firm*—Sughrue, Mion, Zinn, Macpeak & Seas

[57] ABSTRACT

A chain comprising links and pins formed from fiber reinforced thermoplastic resin is disclosed. Each link has bores, and each pin has a body for insertion through the bores of adjoining links to connect the links pivotally. The body has two diametrically opposite rows of grooves formed in its peripheral surface, has a front end from which an annular shell projects coaxially and an axial protrusion extends through the shell coaxially, and has a rear end formed with a flange. The shell has a radially outwardly projecting shoulder formed around its mid-portion, has a frustoconical front end portion, and has radially extending slits which makes the shell radially compressible. The link which has a bore positioned at the inlet for the insertion of the pin, has bosses which are engageable with the flange for holding the pin against rotation to maintain the rows of grooves at right angles with respect to a longitudinal direction of the links. The grooves are continuous between two P and Q planes along which shearing forces act upon the pin.

3 Claims, 4 Drawing Sheets

*Fig. 11*  *Prior Art*

CHAIN AND CONNECTING PIN THEREOF

BACKGROUND OF THE INVENTION

1. Field of the Invention

This invention relates to a chain pin made of synthetic resin used for connecting chain links, and to a chain made of synthetic resin including such pins.

2. Description of the Prior Art

It has been usual to use a pin having a flange at one end for connecting adjoining links in a metal chain, such as of steel or cast iron, and to retain the pin in position by fitting a split or J-shaped pin at another end of the pin, or by upsetting another end of the pin. A chain of synthetic resin has, however, come to be often used in sewer systems, etc., and the methods employed for retaining pins in a metal chain as described above are not applicable to such a chain of synthetic resin.

Japanese Utility Model Publication No. 61-12440 discloses a chain pin which is made of synthetic resin and is still suitable for connecting chain links. The pin has a central cylindrical cavity and a forward cylindrical cavity, the latter being formed at the forward end portion of the pin, forming an extension of the central cavity, and defining the interior of an annular shell. The shell has a shoulder of enlarged diameter and is cut by axial slots to define flexible tangs. When the pin is inserted into the aligned bores of links, the annular shell is elastically deformed to a smaller diameter for insertion of the pin. After the pin passes through the bores of the links, the shoulder restores its original diameter to engage with the outer link, thereby retaining the pin in position.

However, the annular shell has a small wall thickness which creates a problem when the pin is to be removed from the links, though it does not present any problem when the pin is going to be inserted into the links. Its small wall thickness does not allow the shell to be struck with a hammer, or the like, but calls for the use of a special tool for the removal of the pin. Moreover, the central cylindrical cavity of the pin lowers its shearing and bending strength.

SUMMARY OF THE INVENTION

It is, therefore, an object of this invention to provide a connecting pin of a chain which is made of synthetic resin, is easy to remove from the links and is of high strength.

This object is attained by a chain pin for pivotally connecting chain links having bores. The pin is formed from fiber reinforced thermoplastic resin. The pin has a body for insertion through said bores of the links, said body having two diametrically opposite rows of grooves formed in its peripheral surface, and having a front end from which an annular shell projects coaxially therewith and an axial protrusion which extends through said shell coaxially therewith. The shell was a radially outwardly projecting shoulder formed around its mid-portion, a frustoconical front end portion having an outer peripheral surface tapered toward its front end, and at least one radially extending slit which makes said shell radially compressible. The protrusion has a front end which is flush with or projects from said front end of said shell, said pin having means for holding itself against rotation to maintain said rows of grooves at right angles with respect to a longitudinal direction of said links; wherein said grooves continue between two planes along which shearing forces act upon the pin.

It is another object of this invention to provide a plastic chain in which a series of links are connected together by easily removable pins of high shear and bending strength.

BRIEF DESCRIPTION OF THE DRAWINGS

Other objects and advantages of the present invention will become apparent from the following description to be made with reference to the accompanying drawings, in which:

FIG. 11 is a view similar to FIG. 10, but explaining the drawback of the prior art.

DETAILED DESCRIPTION OF THE PREFERRED EMBODIMENT

Figure 1:
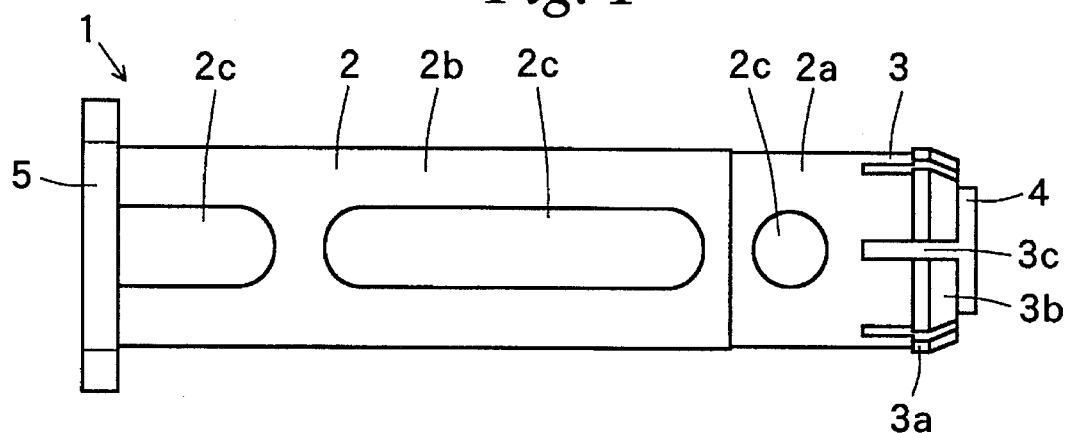
FIG. 1 is a top plan view of a pin embodying this invention.
Figure 2:
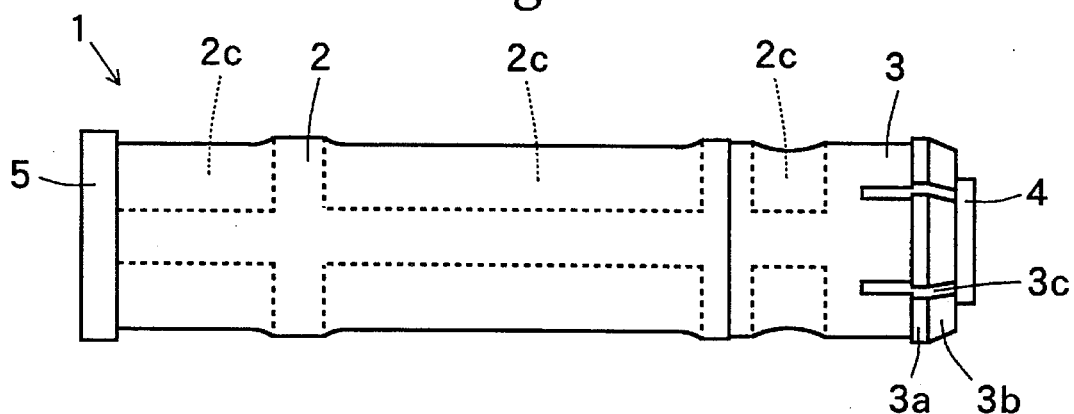
FIG. 2 is a front elevational view thereof.

A pin embodying this invention is shown in FIGS. 1 to 4. The pin 1 comprises a cylindrical body 2 which comprises a front portion 2a having a relatively small diameter as shown on the right-hand side of FIG. 1, and a rear portion 2b having a relatively large diameter as shown on the left-hand side thereof. The front portion 2a has a front end (or a right end as viewed in FIG. 1) from which an annular shell 3 projects coaxially therewith. The shell 3 has a rear (or left) end at which it is of the same diameter with the front portion 2a of the body. The shell 3 has a radially outwardly projecting shoulder 3a formed around its mid-portion, and a frustoconical front end portion having an outer peripheral surface 3b tapered toward its front end. The shell 3 has six radially extending slits 3c which are circumferentially equally spaced apart from one another, and which make the shell 3 radially compressible. An axial protrusion 4 projects from the front portion 2a of the body, extends through the shell 3 coaxially therewith, and has a front (or right) end projecting from the front end of the shell 3.

Figure 5:
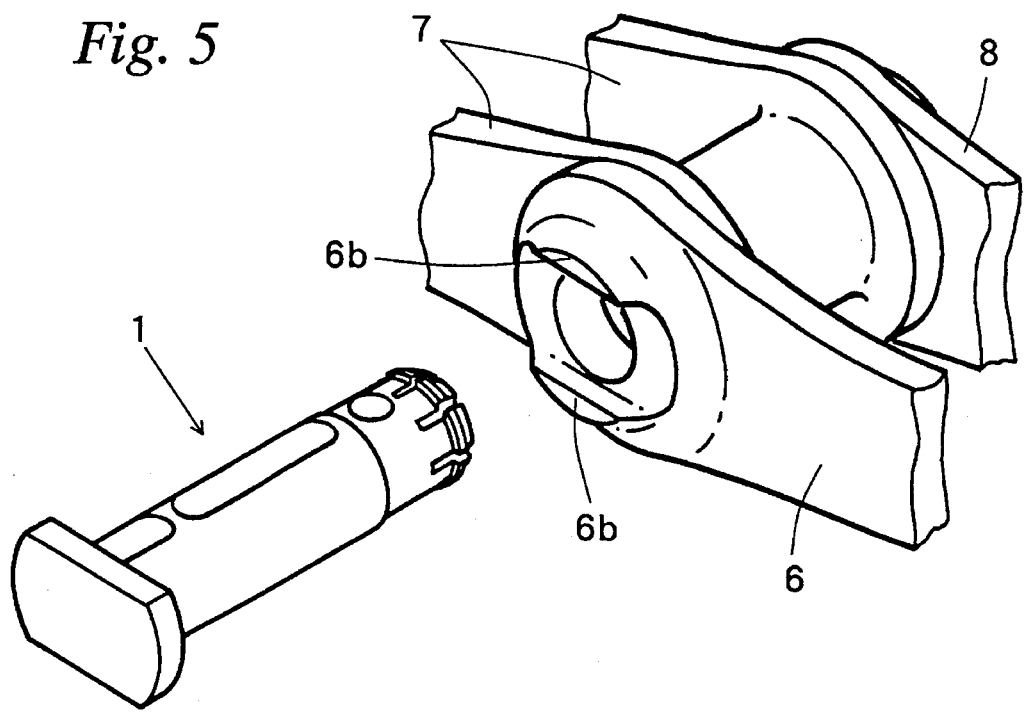
FIG. 5 is a perspective view of the pin which is going to be inserted into adjoining links.
Figure 6:
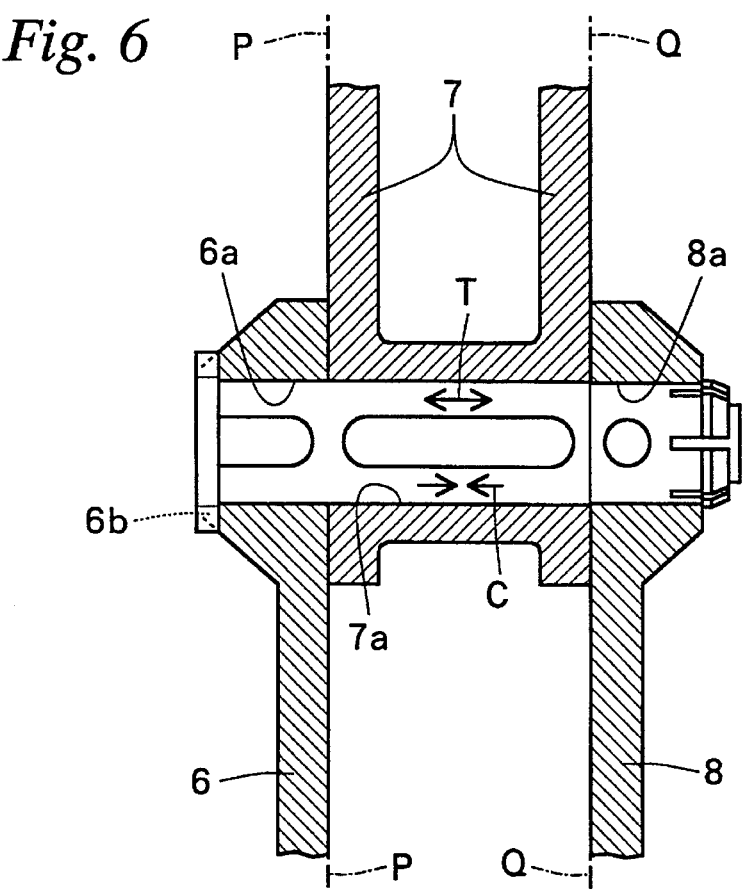
FIG. 6 is a top plan view, partly in section, of a chain embodying this invention.

The body 2 has two diametrically opposite rows of grooves 2c which extend along its length, but are interrupted at two plane positions P and Q (see FIG. 6). Referring to FIGS. 5 and 6, the pin 1 is inserted into the bores 6a, 7a and 8a of an inlet outer link 6, an inner link 7 and an outlet outer link 8, respectively, to couple them together. A tensile force acting upon the longitudinal direction of the links 6 to 8 will make a pair of shearing forces, one acting upon the pin 1 along a shearing plane P which is a border plane between the inlet outer link 6 and the inner link 7, and another acting upon the pin 1 along a shearing plane Q which is a border plane between the inner link 7 and the outlet outer link 8. Therefore, the grooves 2c are separated from one another at two shearing planes P and Q. In other words, the body 2 has a pair of diametrically opposite grooves 2c in its rear portion 2b between its rear end and the shearing plane P, another pair in its rear portion 2b between two shearing planes P and Q, and still another pair in its front portion 2a between its front end and the shearing plane Q.

Figure 3:
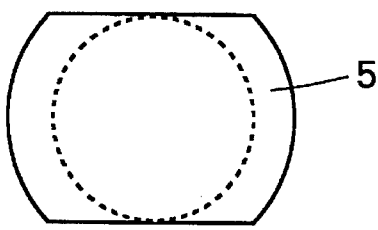
FIG. 3 is a left end view thereof.
Figure 4:
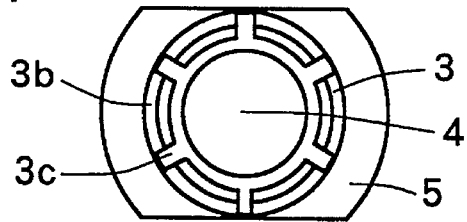
FIG. 4 is a right end view thereof.

The body 2 has a radially outwardly projecting flange 5 formed at the rear (or left) end of its rear portion 2b. The flange 5 has a partly circular shape defined by a pair of arcuate lines facing each other, and a pair of parallel straight lines, as shown in FIG. 3.

The bores 6a to 8a of the links are so sized as to conform to the different diameters of the body 2 of the pin. The bore 8a of the outlet outer link 8 has a relatively small diameter to fit with the front portion 2a of the body, while the bores 6a and 7a of the inlet outer and inner links 6 and 7 have a relatively large diameter to fit with the rear portion 2b of the body. The inlet outer link 6 has a pair of bosses 6b formed on its outer surface and on the diametrically opposite sides, respectively, of the bore 6a, as shown in FIGS. 5 and 6. The bosses 6b are engageable with the straight edges of the flange 5 on the pin to hold the pin 1 against rotation and thereby maintain the grooves 2c at right angles to the longitudinal direction of the links 6 to 8.

When the pin 1 is inserted from the inlet outer link 6 for connecting the links 6 to 8 together, its insertion through the link bores 6a to 8a is facilitated by the guiding action of the tapered surface 3b and the radial compression of the annular shell 3 by its slits 3c. Upon projection of the shoulder 3a from the outlet outer link 8, the shell 3 is released from compression and restores its original shape, and the shoulder 3a engages the outer surface of the outlet outer link 8, whereby the links 6 to 8 are pivotally connected together. The body 2 of the pin can be formed with an equal diameter along its entire length. But if so formed, all link bores 6a to 8a are obliged to be formed also with an equal diameter, and it becomes necessary to press the pin 1 from the very beginning into the bore 6a of the inlet outer link 6. According to this embodiment, on the other hand, the smaller diameter of the front portion 2a of the pin body makes it possible to reduce or even eliminate the work of forcing the pin 1 into the bores 6a and 7a of the first two links 6 and 7, as the bores 6a and 7a have a larger diameter than that of the front portion 2a of the pin body.

The pin 1 can easily be removed from the links 6 to 8, if the head of the protrusion 4 is lightly struck with, e.g. a wooden hammer, as the shoulder 3a of the annular shell 3 is forced to be radially compressed by the bore 8a of the outlet outer link 8. The striking force of the hammer is borne by the protrusion 4, so as to minimize any damage to the annular shell 3 having a small wall thickness. The front end of the protrusion 4 can be formed flush with the front end of the shell 3, but it is better to form the protrusion 4 projecting from the shell 3 so as to avoid any hit on the shell 3. The removal of the pin 1 does not call for the use of any special tool as disclosed in Japanese Utility Model Publication No. 61-12440, but can easily be done even at the site where the chain has been in use.

Figure 7:
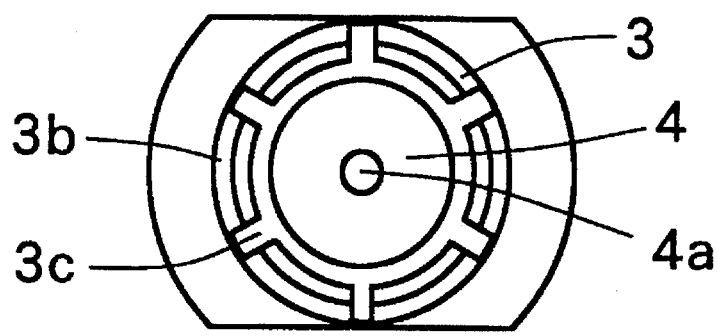
FIG. 7 is a view similar to FIG. 4, but showing a different form of pin embodying this invention.
Figure 8:
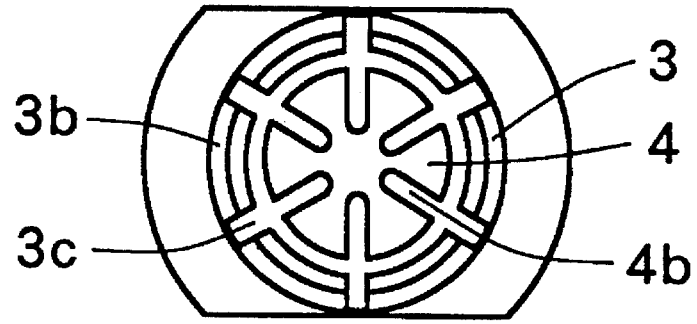
FIG. 8 is a view similar to FIG. 4, but showing a still different form of pin.
Figure 9:
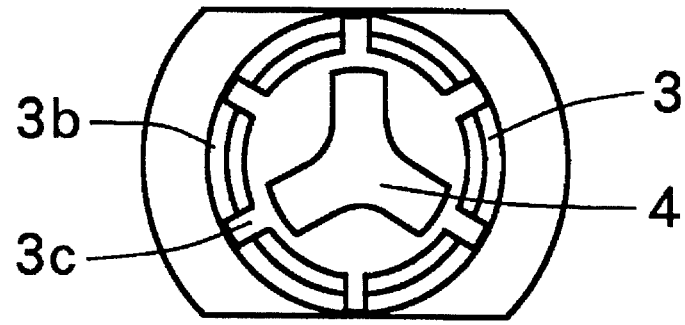
FIG. 9 is a view similar to FIG. 4, but showing a still different form of pin.

Although the annular shell has been described as having six slits 3c, it is equally possible to employ an annular shell having any other appropriate number (even number would be appropriate) of slits, such as four or eight, if it has at least one slit. Although the protrusion 4 has been shown as being a solid cylindrical body, it is also possible to form a protrusion 4 having a bore 4a in its center as shown in FIG. 7, a protrusion 4 having one or more slits 4b as shown in FIG. 8, or a protrusion 4 having a substantially triangular cross section with three concave sides as shown in FIG. 9.

The pin 1 is a product of injection molding from polyamide resin reinforced with glass fibers, while the links 6 to 8 are products of injection molding from polyester resin reinforced with glass fibers. A product of injection molding having a large wall thickness may accompany shrinkage cavities, or may invite large dimensional inaccuracies. The grooves 2c are, therefore, formed in the pin 1 to reduce its wall thickness to a range of, say, 5 to 6 mm. Shearing forces along the shearing planes P and Q constitute both compressive forces and a bending moment upon the pin 1. Those portions of the pin 1 crossed by the planes P and Q do not have any grooves, but remain solid, so that the pin 1 can readily resist such compressions along the planes P and Q. The grooves 2c are formed in rows lying at right angles to the longitudinal direction of the links 6 to 8, so that the pin 1 can readily resist such bending moment.

Figure 10:
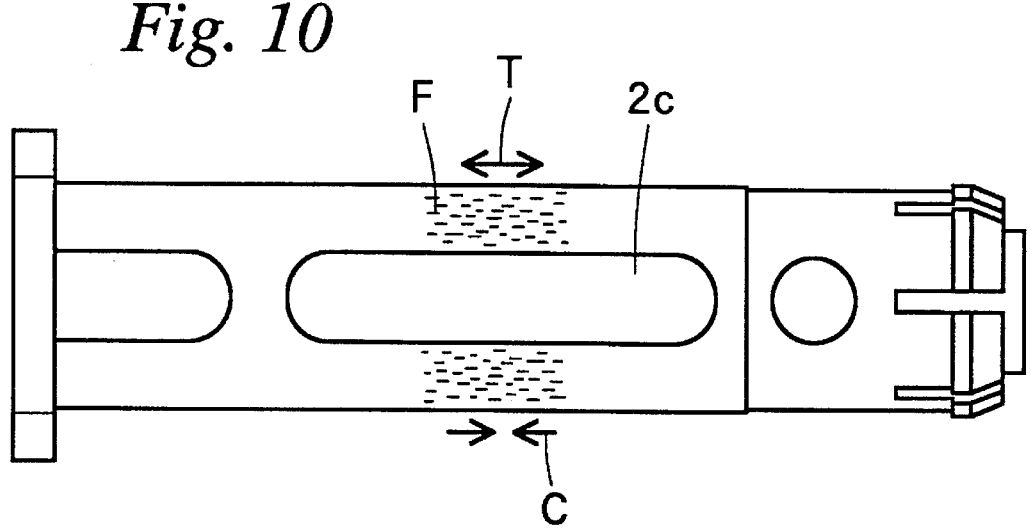
FIG. 10 is a view similar to FIG. 1, but explaining the advantage of this invention.
Figure 10:
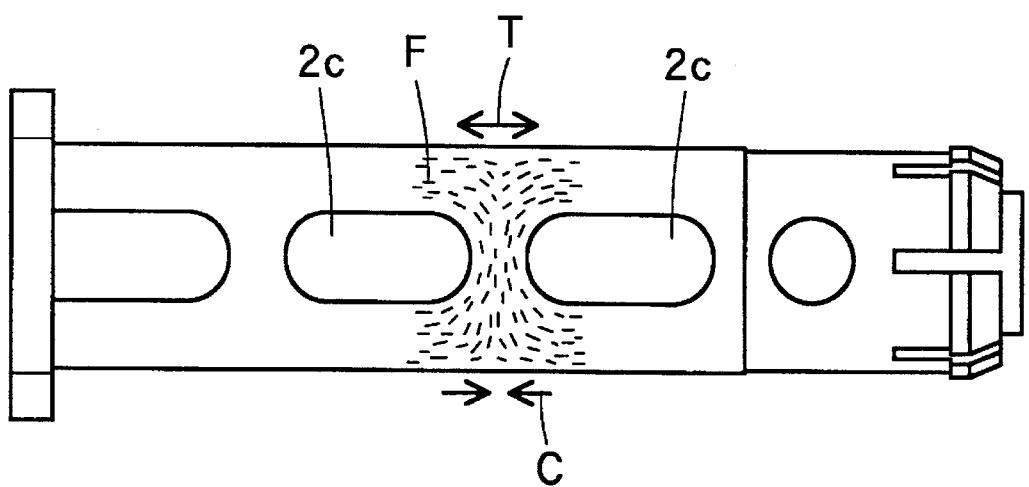

As a result of the bending moment, the maximum tensile stress T works at the inner link side of the central portion of the pin 1 between the shearing planes P and Q, and the maximum compressive stress C works at the the outer link side of the central portion, as shown in FIG. 6. The present inventor, therefore, intended to make a pin having a sufficient strength in its central portion between the planes P and Q, and first made a pin having no grooves but having a solid portion in its central portion between the planes P and Q, as shown in FIG. 11. It was, however, found to not always be satisfactory in strength. As a result of an inquiry into the possible cause, the following was found. While it was necessary to reinforce with glass fibers to obtain a satisfactorily strong pin of a synthetic resin, glass fibers tended to lie in the direction of flow of molten resin, and even lower the strength of the pin against any tensile force upon it in a direction normal to the fibers. The pin had a somewhat complicated shape in its central solid portion between the planes P and Q, and it disturbed the orderly flow of glass fibers F and caused a part of them to lie substantially at right angles to the longitudinal axis of the pin, as shown in FIG. 11, so that the pin was not satisfactorily strong against the tensile stress T acting upon it along its longitudinal axis. It was, therefore, decided to remove the central solid portion from the pin and connect the two grooves 2c into one, and thereby make a satisfactorily strong pin, in which glass fibers F are regularly oriented along its longitudinal axis at the central portion between the shearing planes P and Q, as shown in FIG. 10.

Although the embodiments of the present invention have been described above, various modifications are possible without departing from the spirit of the invention which is defined solely in the appended claims. For example, as for the synthetic resin, it is not limited to adopt those materials written in the above embodiment, but it may also possible to use various thermoplastic resins which are often referred to as engineering plastics, such as polyethylene terephthalate, polybutylene terephthalate, polyphenylene oxide, polyphenylene sulfide, polyamideimido, polyether sulfone, liquid crystal polymer showing liquid crystallinity in a molten state (e.g., liquid crystal polyesters). As for the reinforcing filler which is mixed with the above resin, it is not limited to adopt glass fiber, but it may also possible to use such known material as carbon fiber, mineral filler, etc. As for the mixing rate of the filler, if it is too low, then it is impossible to sufficiently increase the mechanical strength, and if it is too high, then it becomes difficult to form the required product. Thus, it is preferable to have the mixing rate in the range of 10 to 50 weight percent (more preferably 20 to 40 percent).

What is claimed is:

1. A chain pin for pivotally connecting chain links having bores, adjoining links of the chain links including an inlet outer link, an inner link and an outlet outer link, said chain pin comprising:

a body for insertion through said bores of the chain links, said body being formed from fiber reinforced thermoplastic resin and having a peripheral surface, said body having two diametrically opposite rows of grooves formed in said peripheral surface, and having a front end from which an annular shell projects coaxially therewith and an axial protrusion which extends through said shell coaxially therewith, wherein said shell includes a mid-portion having a radially outwardly projecting shoulder formed therearound, a frustoconical front end portion having a front end and an outer peripheral surface tapered toward said front end, and at least one radially extending slit which makes said shell radially compressible, wherein said protrusion includes a front end surface which is one of flush with and projects from said front end of said shell;

said chain pin further comprising means for holding said chain pin against rotation to maintain said rows of grooves at right angles with respect to a longitudinal direction of the chain links;

wherein the inlet outer link and the inner link define a first border, shearing plane therebetween, and the inner link and the outlet outer link define a second border, shearing plane therebetween, said first and second border, shearing planes defining a distance therebetween, wherein said pin is formed solid at said first and second border, shearing planes when said pin is fully inserted, and wherein two of said diametrically opposite grooves of said pin extend continuously for substantially the entire distance between said first and second border, shearing planes when said pin is fully inserted.

2. In a chain comprising a plurality of links and a plurality of pins, said links being formed from fiber reinforced thermoplastic resin and including an inlet outer link, an inner link, and an outlet outer link, and each having bores, said pins being formed from fiber reinforced thermoplastic resin, and each having a body for insertion through said bores of adjoining links to connect said links pivotally, said body having a peripheral surface, with two diametrically opposite rows of grooves formed in said peripheral surface, having a front end from which an annular shell projects coaxially therewith and an axial protrusion which extends through said shell coaxially therewith, and having a rear end formed with a flange having a peripheral edge of which at least a part has a flat surface, said shell having a mid-portion with a radially outwardly projecting shoulder formed therearound, having a frustoconical front end portion having a front end and an outer peripheral surface tapered toward said front end, and having at least one radially extending slit which makes said shell radially compressible, said protrusion having a front end surface which is one of flush with and projects from said front end of said shell, each inlet outer link of said links having an inlet bore for said insertion of a respective pin, and at least one boss on an outer surface thereof which is engageable with said flange for holding said pin against rotation to maintain said rows of grooves at right angles with respect to a longitudinal direction of said links;

wherein said inlet outer link and said inner link of adjoining links define a first border, shearing plane therebetween, and said inner link and said outlet outer link define a second border, shearing plane therebetween, said first and second border, shearing planes defining a distance therebetween, wherein a corresponding pin is formed solid at said first and second border, shearing planes when said corresponding pin is fully inserted, and wherein two of said diametrically opposite grooves of said corresponding pin extend continuously for substantially the entire distance between said first and second border, shearing planes when said corresponding pin is fully inserted.

3. The chain as set forth in claim 2, wherein the outlet outer link comprises a bore, said bore positioned in said outlet outer link for said insertion of a corresponding said pin has a smaller diameter than the other bores of said inlet outer link and said inner link, and said body of the corresponding pin has a front portion having a smaller diameter so as to fit within said bore positioned in the outlet outer link, and a rear portion having a larger diameter so as to fit within said other bores.

* * * * *